United States Patent [19]

Schultz et al.

[11] Patent Number: 5,611,168

[45] Date of Patent: Mar. 18, 1997

[54] FISHING LURE WITH TEETH AND BODY CLOSURE

[76] Inventors: Benjamin I. Schultz; Leslie A. Thomas, both of 3706 N. Ocean Blvd., Suite 352, Ft. Lauderdale, Fla. 33308

[21] Appl. No.: 561,798

[22] Filed: Nov. 22, 1995

[51] Int. Cl.⁶ .................................................. A01K 83/06
[52] U.S. Cl. ...................................... 43/44.6; 43/44.8
[58] Field of Search .................. 43/42.37, 44.6, 43/44.8, 44.2, 44.4, 41

[56] References Cited

U.S. PATENT DOCUMENTS

| | | | |
|---|---|---|---|
| 1,902,217 | 3/1933 | Catarau | 43/44.2 |
| 2,500,451 | 3/1950 | Codd | 43/41 |
| 2,557,577 | 6/1951 | Soma | 43/41 |
| 2,765,574 | 10/1956 | Martin | 43/44.4 |
| 2,937,466 | 5/1960 | Mays | 43/41 |
| 2,940,208 | 6/1960 | Oswald | 43/44.6 |
| 3,200,532 | 8/1965 | Walton | 43/44.6 |
| 3,289,346 | 12/1966 | Ehling | 43/44.6 |
| 3,760,526 | 9/1973 | Hicks | 43/44.4 |
| 3,760,529 | 9/1973 | Hicks | 43/41 |
| 3,844,060 | 10/1974 | Kurachi | 43/41 |
| 3,893,255 | 7/1975 | Hicks | 43/41 |
| 3,914,896 | 10/1975 | Sahagian | 43/44.6 |
| 4,233,771 | 11/1980 | Robinson | 43/41 |
| 4,796,376 | 1/1989 | Schlaegel | 43/42.29 |
| 4,848,023 | 7/1989 | Ryder et al. | 43/44.6 X |

*Primary Examiner*—Jeanne M. Elpel
*Attorney, Agent, or Firm*—Oltman, Flynn & Kubler

[57] ABSTRACT

Deep sea fishing lures for adequately securing bait. The lure has a bait housing that includes upper and lower cylindrical half jaws that are pivotally connected at their front ends and biased together by a spring. Inside the upper jaw are at least two rows of teeth one behind the other, and inside the lower jaw are at least two rows of teeth, one behind the other. The upper front row of teeth and the lower front row of teeth are approximately ⅛ inches long. The upper rear row of teeth and the lower rear row of teeth are approximately ⅛ inches long. The teeth can be cone shaped and formed from either plastic or metal. Covers can be inserted next to one of the rows of teeth to change the length of each of the teeth. Using the covers allows the lure to be able to secure thinner pieces of bait fish. The lure includes a wall ahead of the front rows of teeth which prevents water from passing through the interior of the bait housing and washing out bait.

16 Claims, 3 Drawing Sheets

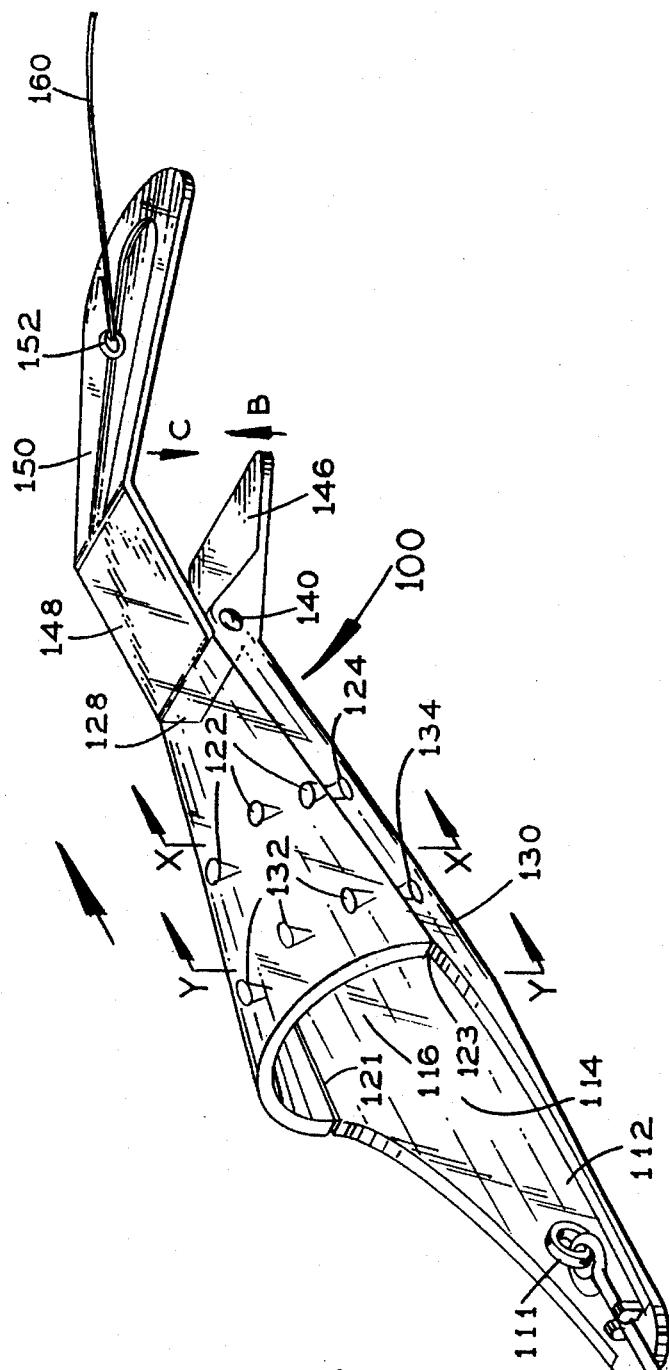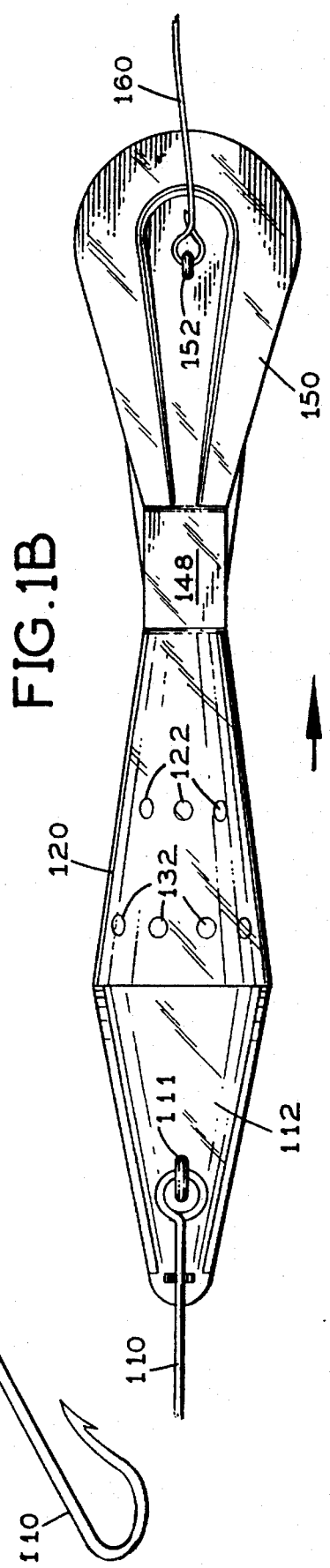

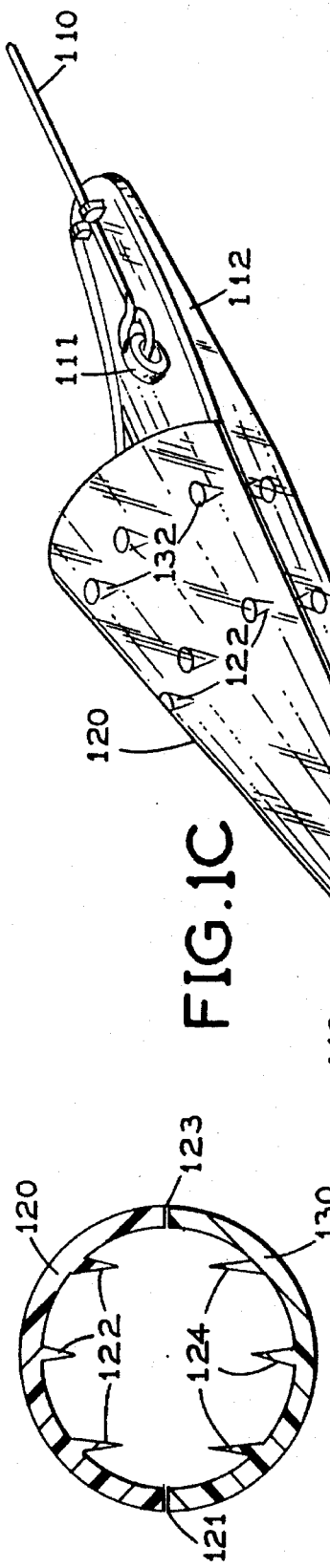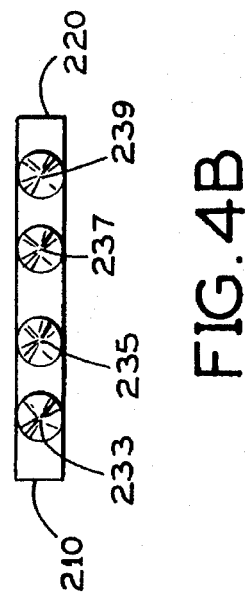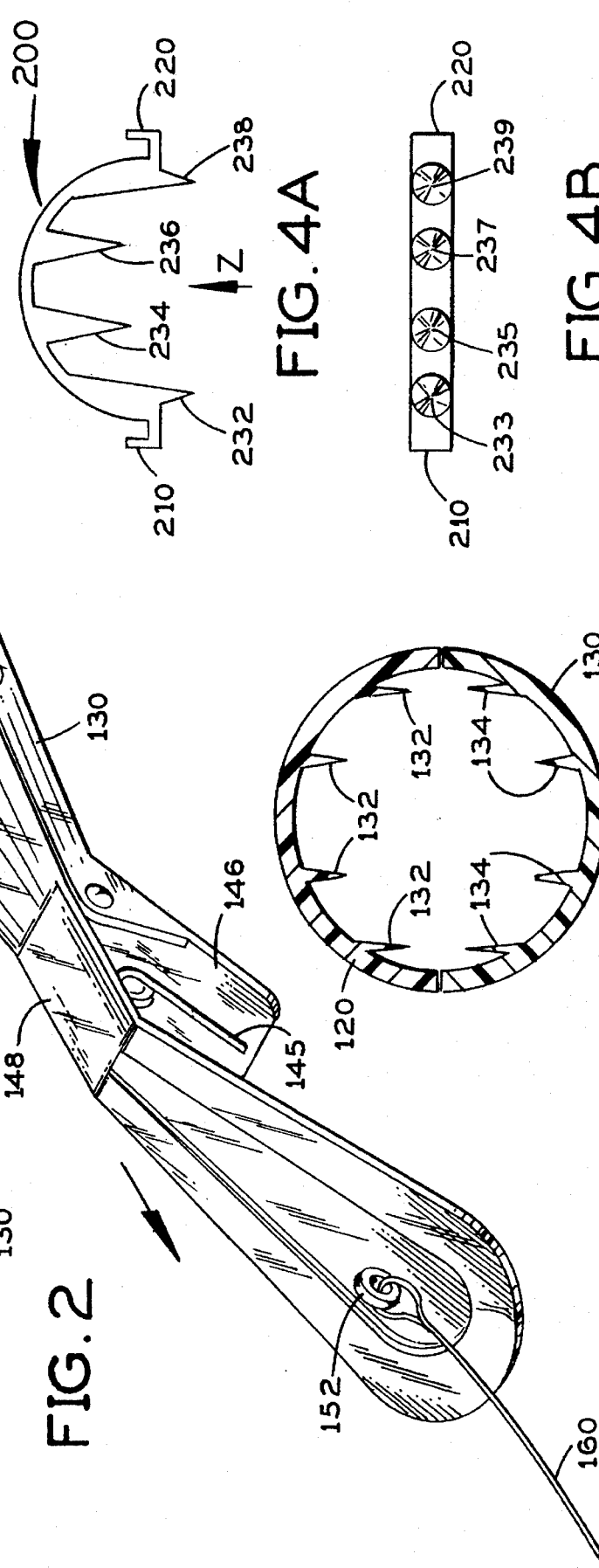

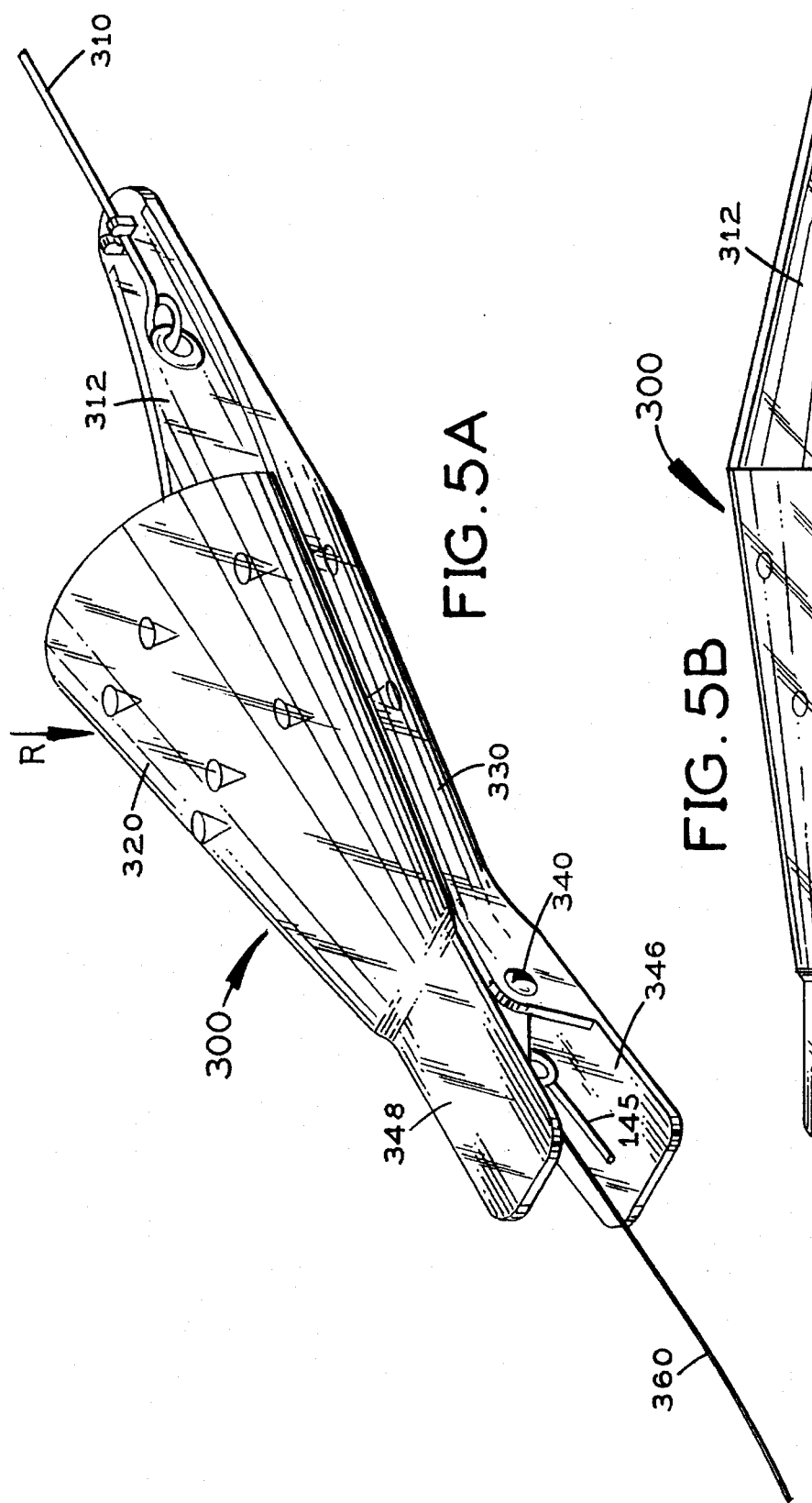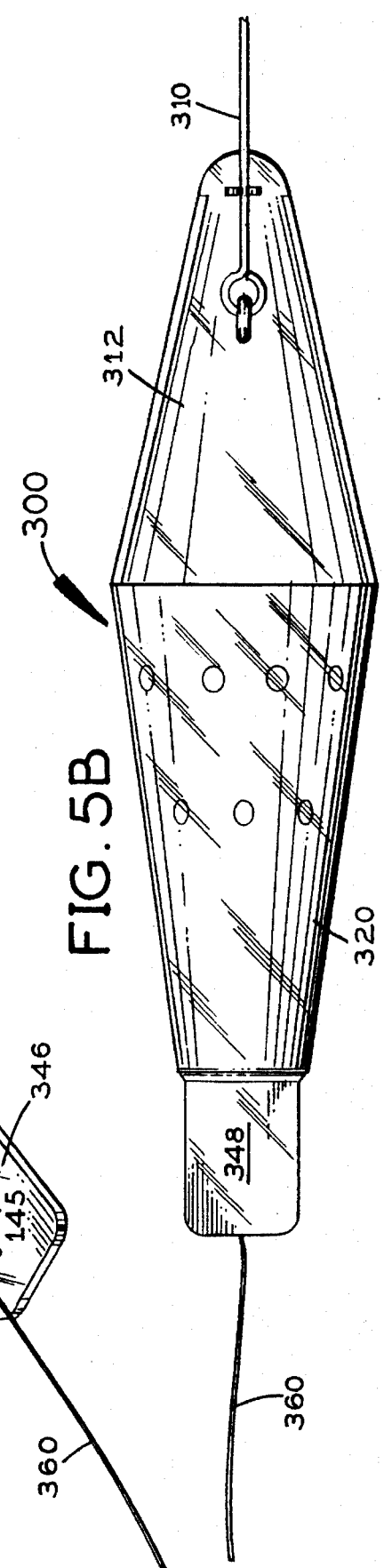

5,611,168

FISHING LURE WITH TEETH AND BODY CLOSURE

This invention relates to fishing lures, and in particular to deep sea bait holding devices having interior teeth for trapping and holding bait within the lure which is attached to a fishing line.

BACKGROUND OF THE INVENTION

Fishing lures holding bait such as shrimp, minnows, herring and the like have been extensively used in the past. The bait is used to attract the fish as surrounding water passes about the lure. See for example U.S. Pat. Nos. 2,500,451 to Codd; 2,557,577 to Soma; 2,765,574 to Martin; 2,937,466 to Mays; 3,760,526 to Hicks; 3,760,529 to Hicks; 3,844,060 to Kurachi; 3,914,896 to Sahagian; 4,233,771 to Robinson; 4,796,376 to Schlaegel; 3,914,896 to Sahagian and 3,893,255 to Hicks.

However, several problems exist with many of these prior art lures. For example, many of the lures inadequately secure the enclosed bait in place resulting in losing the bait to the passing water current. The bait holding housing allows water to pass about the bait and dislodge the bait from the housing. Thus, fishermen have to constantly replenish the bait in these prior art lures. Furthermore, many of the lures are capable of holding only one size of bait and thus are not versatile enough to hold different sizes of bait for catching different sizes of fish.

Thus, the need exists for an improved fishing lure that avoids the problems of the prior art discussed above.

SUMMARY OF THE INVENTION

The first objective of the present invention is to provide a fishing lure for adequately securing bait to the lure.

The second object of this invention is to provide a fishing lure having rows of interior teeth for securing the bait within the lure.

The third object of this invention is to provide a fishing lure that does not allow water to pass through the interior of the bait support housing.

The fourth object of this invention is to provide a fishing lure for securing various size bait within its housing.

Two preferred embodiments of fishing lures are described. The first preferred embodiment includes an elongated upper jaw having a front end and a rear end, an elongated lower jaw having a front end and a rear end, and a pivotal connection hinge between the front end of the upper jaw and the front end of the lower jaw. A biasing spring keeps the upper and lower jaw members together. The upper jaw includes a front row of teeth and a rear row of teeth located parallel to one another. The bottom jaw includes a similar set of a front row of teeth and a rear row of teeth located in parallel to one another. Bait fish are secured between upper and lower jaw members. A fishing hook is connected to the back end of the lower jaw. A forward projecting tab connected to a fishing line angles at 45 degrees from the pivotal connection hinge. Each of the individual teeth members are cone shaped. All of the teeth in the front row are approximately ⅛ inches long, and each of the rear teeth are approximately ⅛ inches long. Detachable teeth covers approximately ⅝ inches long can be used for lengthening each tooth of the upper rear rows of teeth. The materials used in the lure can be molded plastic, see-through plastic, metal such as aluminum, stainless steel and the like and combinations thereof.

The second embodiment is similar to the first embodiment with the exception of not using the 45 degree bent tab for attachment to a fishing line.

Further objects and advantages of this invention will be apparent from the following detailed description of a presently preferred embodiment which is illustrated schematically in the accompanying drawings.

BRIEF DESCRIPTION OF THE DRAWINGS

FIG. 1A is a perspective view of a first preferred embodiment of the subject invention;

FIG. 1B is a top view of the embodiment of FIG. 1A along arrow A;

FIG. 1C is a perspective view of the embodiment of FIG. 1A oriented differently;

FIG. 2 is a cross-sectional view of the top front row of teeth of FIG. 1A along arrows X;

FIG. 3 is a cross-sectional view of the top rear row of teeth 132 of FIG. 1A along arrow Y;

FIG. 4A is a side view of a detachable cover plate for use with the embodiment of FIG. 1A;

FIG. 4B is a bottom view of the cover plate of FIG. 4A along arrow Z;

FIG. 5A is a perspective view of a second preferred embodiment of the subject invention; and FIG. 5B is a top view of the embodiment of FIG. 5A along arrow R.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1A is a perspective view of a first preferred embodiment 100 of the subject invention. FIG. 1B is a top view of the embodiment of FIG. 1A along arrow A. Referring to FIGS. 1A and 1B, the subject invention 100 includes a hook 110 attached to loop hook end 111 on rear tab 112. An open channel area 114 is formed between upper hollow U-shaped jaw member 120 and lower hollow U-shaped jaw member 130 which are pivotally connected along rotatable hinge 140. Jaw members 120 and 130 are biased in a closed position by interior spring 145. To open jaw members 120 and 130, a user compresses tab 146 upward along the direction of arrow B while pushing surface area 148 in a downward direction along the direction of arrow C. Inside of each jaw member 120 and 130 are front rows of teeth members 122 and 124 which face one another, and at least two rows of rear teeth members 132 and 134 which face one another. Cavity area 114 has a larger diameter at the back area 116 going toward a smaller and narrow diameter toward the front.

FIG. 2 is a cross-sectional view of the top front row of teeth 122 of FIG. 1A including individual teeth 123 taken along the direction of arrow X. FIG. 3 is a cross-sectional view of the top rear row of teeth 132 of FIG. 1A along with each of the individual teeth 133 along the direction of arrow Y. Referring to FIGS. 1A, 1B, 2 and 3, each tooth is cone shaped and is approximately ⅛ inch in length for the rear rows of teeth and approximately ⅛ inch in length for each of the front rows of teeth. The rows of teeth 122, 132, 124, 134 can effectively secure small bait such as ballyhoo, mullet and the like therebetween. FIG. 1C is a perspective view of the embodiment 100 of FIG. 1A.

Referring to FIGS. 1A–1C, the material used for upper and lower jaw members 120 and 130 can be a visually clear plastic which would allow for the bait inside to be visible outside. In the back areas of each of the jaw members 120 and 130 are respective half wall members 128 and 138 which when in the closed position can effectively block any water from passing through channel space 114. Front tab 150 is bent at approximately a 45 degree angle relative to the rest of the structure with an eye socket 152 for attachment to a fishing line 160. Thus, lure 100 moves in the direction of arrow D. The 45 degree bend allows the lure to dive into the water and be used for deep sea fishing. The materials forming the various components in the preferred embodiment 100 of FIGS. 1A–1B can be formed from molded plastic, metal such as but not limited to aluminum, stainless steel and the like, as well as combinations thereof.

FIG. 4A is a side view of a detachable cover plate for use with the embodiment of FIG. 1A. FIG. 4B is a bottom view of the cover plate of FIG. 4A along arrow Z. Referring to FIGS. 4A–4B, detachable upper teeth cover includes side clips 210 and 220 for attaching the cover plate to the side edges 121,123 of upper U-shaped jaw member 120 of FIG. 1A. Cover 200 includes elongated teeth 232,234,236,238 that have tops 233,235,237,239. Cover 200 fits next to rear upper teeth 132 of FIG. 3. Using these detachable covers allows for adequately securing thinner sizes of fish bait within the clamping jaw members 120 and 130. The length of the individual teeth members 232,234,236 and 238 is longer than the length of the existing row of teeth 132 which is to be covered. For example, teeth 232,234,236 and 238 can have a length of ⅝ of an inch.

FIG. 5A is a perspective view of a second preferred embodiment of the subject invention. FIG. 5B is a top view of the embodiment of FIG. 5A along arrow R. Referring to FIGS. 5A and 5B, embodiment 300 includes an upper jaw member 320, lower jaw member 330, hinge spring 340, clamping members 346,348, fish hook 310 and fishing line 360 which correspond to like components of FIGS. 1A–1C with the exception that embodiment 300 does not include a 45 degree bend to an attaching tab member adjacent to the clamping portions 346 and 348 as is shown by 150 in FIG. 1A. Embodiment 300 can include rows of teeth and the detachable teeth cover as previously described.

We claim:

1. A fishing lure for securing bait comprising:

an elongated upper jaw having a front end and a rear end;

an elongated lower jaw having a front end and a rear end;

a pivotal connection hinge between the front end of the upper jaw and the front end of the lower jaw;

a first row of teeth on an interior surface of the upper jaw;

a second row of teeth affixed to an interior surface of the lower jaw, the first row of teeth facing the second row of teeth, wherein bait fish are secured between the first row of teeth and the second row of teeth; and a hook connected to the rear end of the lower jaw;

a top half wall attached to the upper jaw forward of the first row of teeth; and a bottom half wall attached to the lower jaw forward of the second row of teeth, wherein closing the upper jaw to the lower jaw enables the top half wall to cause a closure against the bottom half wall for keeping water from washing the bait out.

2. The fishing lure of claim 1, further comprising:

a spring for biasing the upper elongated jaw and the lower elongated jaw together along the pivotal connection hinge.

3. The fishing lure of claim 1, further comprising:

a third row of teeth affixed to the upper elongated jaw rearwardly of the first row of teeth; and a fourth row of teeth affixed to the lower elongated jaw rearwardly of the second row of teeth, wherein the third row of teeth is facing the fourth row of teeth.

4. The fishing lure of claim 3, further comprising:

a detachable fifth row of teeth attached to the upper elongated jaw rearwardly of the third row of teeth.

5. The fishing lure of claim 3, wherein each tooth in the third row of teeth and the fourth row of teeth is:

approximately ⅛ inches long.

6. The fishing lure of claim 3, further comprising:

a detachable upper teeth cover for the third row of teeth.

7. The fishing lure of claim 1, wherein each tooth in the first row of teeth and the second row of teeth is:

individually cone shaped.

8. The fishing lure of claim 1, wherein each tooth in the first row of teeth and the second row of teeth is:

approximately 1/s1 inches long.

9. The fishing lure of claim 1, further comprising:

a tab bent at approximately 45 degrees to a longitudinal direction of said lure, said tab adjacent to the pivotal connection hinge.

10. The fishing lure of claim 1, wherein the first row of teeth and the second row of teeth are formed from metal.

11. The fishing lure of claim 1, wherein the first row of teeth and the second row of teeth are formed from:

plastic.

12. A fishing lure for securing bait comprising:

an elongated upper Jaw having a front end and a rear end;

an elongated lower jaw having a front end and a rear end;

a pivotal connection hinge between the front end of the upper jaw and the front end of the lower jaw;

a top front row of teeth on an interior surface of the upper jaw;

a bottom front row of teeth affixed to an interior surface of the lower jaw, the top front row of teeth facing the bottom front row of teeth, wherein the bait fish are secured between the top front row of teeth and the bottom front row of teeth;

a top rear row of teeth attached to the upper elongated jaw rearwardly of the top front row of teeth;

a bottom rear row of teeth attached to the lower elongated jaw rearwardly of the bottom front row of teeth, wherein the top rear row of teeth is facing the bottom rear row of teeth; and a hook connected to the rear end of the lower jaw;

wherein each of the teeth in the top front row of teeth and the bottom front row of teeth is:

approximately ⅛ inches long, and wherein each tooth in the top rear row of teeth and the bottom rear row of teeth is:

approximately ⅛ inches long;

further comprising a detachable upper teeth cover for lengthening the upper rear row of teeth.

13. The fishing lure of claim 12, wherein the detachable upper teeth cover is:

plastic.

14. The fishing lure of claim 12, wherein the detachable upper teeth cover is:

metal.

15. A fishing lure for securing bait comprising:

an elongated upper jaw having a front end and a rear end;

an elongated lower jaw having a front end and a rear end;

a pivotal connection hinge between the front end of the upper jaw and the front end of the lower jaw;

a first row of teeth on an interior surface of the upper jaw;

a second row of teeth affixed to an interior surface of the lower jaw, the first row of teeth facing the second row of teeth, wherein bait fish are secured between the first row of teeth and the second row of teeth;

a hook connected to the rear end of the lower jaw; and a detachable third row of teeth attached to the upper elongated jaw rearwardly of the first row of teeth.

16. The fishing lure of claim 15 further comprising:

a top half wall attached to the upper jaw forward of the first row of teeth; and a bottom half wall attached to the lower jaw forward of the second row of teeth, wherein closing the upper jaw to the lower jaw enables the top half wall to cause a closure against the bottom half wall for keeping water from washing the bait out.

* * * * *